United States Patent [19]

Kyle

[11] 4,405,674
[45] Sep. 20, 1983

[54] PROCESS FOR MAKING A MAGNETIC MATERIAL CONTAINING CARPET TILE AND CARPET TILE

[75] Inventor: Joseph H. Kyle, LaGrange, Ga.

[73] Assignee: Carpets International-Georgia (Sales), Inc., LaGrange, Ga.

[21] Appl. No.: 408,597

[22] Filed: Aug. 16, 1982

Related U.S. Application Data

[63] Continuation of Ser. No. 259,566, May 1, 1981, abandoned.

[51] Int. Cl.³ ............................................... B32B 3/02
[52] U.S. Cl. .......................................... 428/96; 427/47;
 427/128; 427/130; 427/289; 428/522; 428/692;
 428/900
[58] Field of Search ................. 427/47, 128, 130, 289;
 428/96, 522, 692, 900

Primary Examiner—Bernard D. Pianalto
Attorney, Agent, or Firm—Burns, Doane, Swecker & Mathis

[57] ABSTRACT

A process for manufacturing a magnetic material-containing carpet tile which comprises: forming a uniform fluid mixture of a liquid resinous material (e.g., vinyl chloride plastisol or poly(acrylic acid) water-based emulsion) and at least about 60% by weight of the mixture of a particulate magnetizable material (e.g., barium ferrite), applying the uniform fluid mixture to the back of a carpet facing to form a carpet composite, heating the carpet composite to solidify the mixture and fuse the mixture with the carpet facing and thereby provide a carpet covering, forming the resulting magnetized carpet covering into carpet tiles and applying a magnetic force to the carpet tiles to magnetize the particulate magnetizable material.

9 Claims, 2 Drawing Figures

PROCESS FOR MAKING A MAGNETIC MATERIAL CONTAINING CARPET TILE AND CARPET TILE

This is a continuation, of application Ser. No. 259,566, filed May 1, 1981, now abandoned.

BACKGROUND OF THE INVENTION

In recent years, there has been considerable interest in carpet tiles. Carpet tiles offer considerable advantages over rugs or wall-to-wall carpeting which have been heretofore used extensively. For example, the use of carpet tiles for floor covering allows the removal of individual tiles which have become worn or soiled more than other tiles. Those tile which are not worn or soiled may be left in place. Additionally, tiles may be rearranged or replaced to enhanced decorative effects.

Carpet tile and carpet construction are well-known in the art and are shown for example in U.S. Pat. Nos. 3,402,094; 3,347,735; 3,764,448; 3,238,595; 2,776,233; 3,173,823; 3,309,259; 3,320,113; 3,515,622; 3,642,516, 3,120,023; and 3,014,829. In addition, carpet tiles of various constructions have been available commercially. A particularly advantageous carpet tile is disclosed and claimed in U.S. Pat. No. 4,010,301.

It has been suggested to include magnetic particles into floor coverings (other than carpet tiles) to enhance the attachment of the floor coverings to floors having at least one section which may contain a magnetically permeable metal. See for example, U.S. Pat. Nos. 4,184,304 and 3,341,996. The latter patent discloses forming a sheet of a minor amount of vinyl chloride and a major amount of barium ferrite by milling the materials together and then passing the mixture through a sheeting mill. The sheet is cut to tile size and laminated to the back of a thicker vinyl chloride tile sheet by hot pressing the sheets together. This procedure is relatively expensive due to the number and type of steps involved. In addition, lamination is difficult to control and two laminated sheets may separate during use, particularly when lateral stresses are applied to one sheet of the laminate. Separation of the two sheets, either complete or in part (which can result in bulging of the top sheet), makes the product unacceptable.

Various patents disclose methods of incorporating magnetic materials into thermoplastic or rubbery type materials. See for example, U.S. Pat. Nos. 989,967 and 3,051,988. It is also known to incorporate magnetic materials into wall coverings. See for example U.S. Pat. Nos. 3,609,934; 3,986,312; and 3,982,370.

It has been found that there exist manifold difficulties in forming carpet tiles including magnetized coatings even though the advantages of such a product are apparent. For example, the use of strips of magnetizable material such as disclosed in some of the prior art mentioned above, requires the fitting of such strips into preformed or subsequently formed carpet and/or carpet tile to avoid an uneven height of the carpet tile. Such a procedure is relatively difficult and costly. Similarly, lamination of a preformed sheet is relatively difficult and expensive.

It is similarly useful to include the magnetic materials in the lowest portion of the backing of the carpet tile since a lesser amount of material can be utilized to obtain the same amount of magnetic attraction that would be obtained than if the material were uniformly dispersed throughout the majority of the thickness of the carpet tile.

These problems are particularly acute with the production of flexible carpet tiles.

It has also been found very difficult to incorporate substantial amounts (that is, greater than 75% by weight) of magnetizable permanent magnetic materials such as the ferrites of the type $MO.6Fe_2O_3$ where M is one or more of Ba, Sr, Ca or Pb, into many of the synthetic resinous materials used in manufacturing carpet tiles, particularly vinyl chloride plastisols. These magnetizable permanent magnetic materials are otherwise advantageous and desired for use in such articles.

OBJECTS AND SUMMARY OF THE INVENTION

It is an object of the present invention to avoid or alleviate the problems of the prior art.

It is also an object of the present invention to provide a process for manufacturing a flexible carpet tile including a magnetic material.

It is a further object of the present invention to provide a method for forming a magnetic material-containing carpet tile which can be applied as a backing to various carpet faces.

There is provided a process for manufacturing a magnetic material-containing carpet tile comprising: forming a uniform fluid mixture of a liquid resinous material and at least about 60% by weight of the mixture of a particulate magnetizable material; applying the said uniform fluid mixture to the back of a carpet facing to form a carpet composite; heating the said carpet composite to solidify the mixture and fuse the mixture with the carpet facing and thereby provide a carpet covering; forming the resulting magnetized carpet covering into carpet tiles; and applying a magnetic force to the carpet tiles to magnetize the particulate magnetizable material.

DETAILED DESCRIPTION OF THE INVENTION

Figure 1:
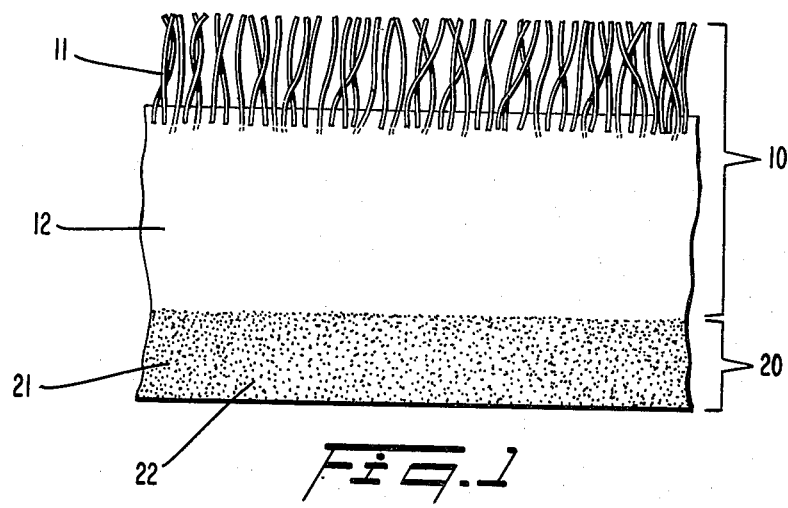
FIG. 1 is a cross-sectional representation of a typical carpet tile of the present invention including the magnetic material.

As shown in FIG. 1, the carpet tile of the present invention includes a facing portion generally indicated as 10 which can include woven, tufted or fusion-bonded facing material 11 embedded in a resinous portion 12 which may contain one or more layers of fiberglass scrim, polyester fibers and/or mixtures thereof (not shown) and a backing portion generally indicated as 20 which is formed of a resinous material 21 and at least about 75 weight percent of a permanently magnetizable particulate material 22 further described hereinafter uniformly dispersed throughout the backing portion 20. It has been found that while amounts substantially less than about 75% by weight of the permanently magnetizable material (e.g., about 50% by weight) are sufficient to impart some magnetic properties to the resulting carpet tile, the inclusion of the higher amounts of at least about 60%, preferably at least about 75%, by weight of the permanently magnetizable material are preferred to ensure that the resulting carpet tiles function properly (lie flat without moving) in their intended use. Although the finished carpet tile of the present invention shows a unitary form, and as described in more detail herein below, the backing portion of the carpet tile including the particulate permanently magnetizable material is prepared separately in liquid form and cured onto the back portion of the facing portion so as to result in this unitary carpet tile.

Figure 2:
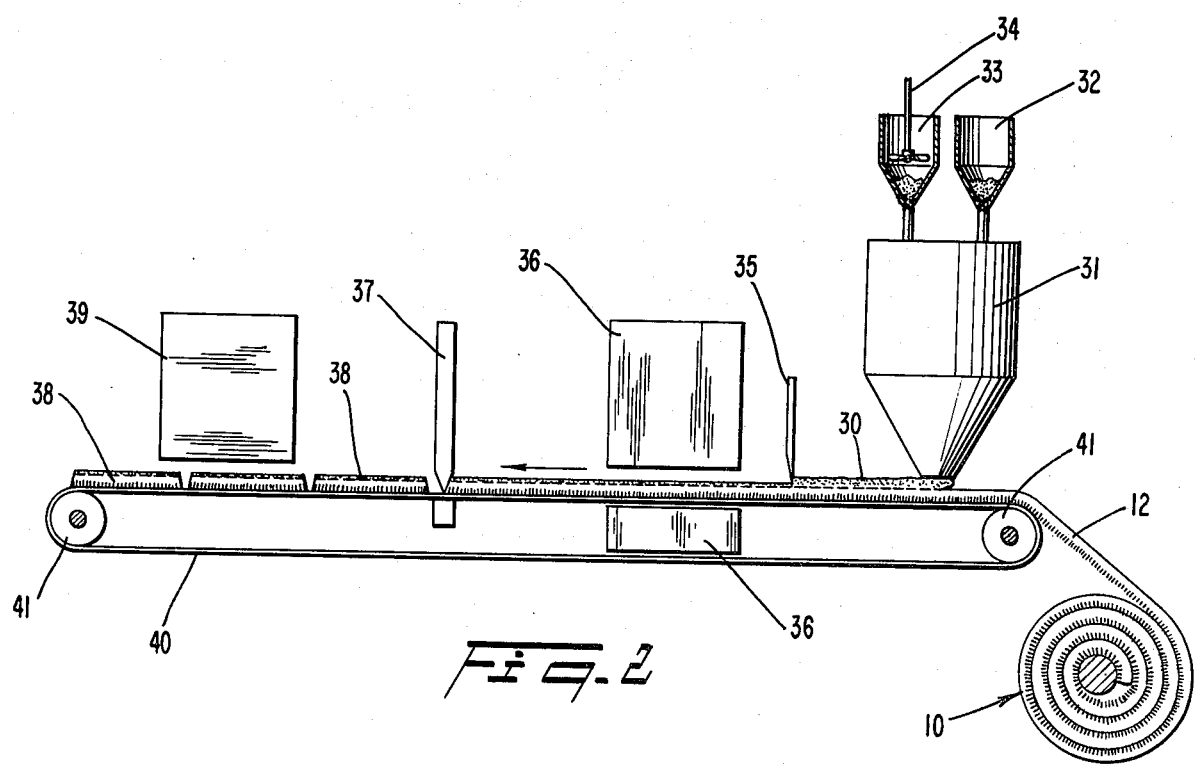
FIG. 2 is a representation of a process line incorporating the process of the present invention.

As generally indicated in FIG. 2 and as is described in more detail hereafter, the carpet facing portion 10 which is preferably preformed is coated on its rear portion (the side away from the facing material 11) with a liquid magnetizable material-containing resinous composition 30 which is applied from a mixing chamber 31. This composition can be formed from the admixture of two pre-mixes formed in mixing chambers 32 and 33, the latter being equipped with high shear mixing means generally indicated as 34. It will be understood that chambers 31 and 32 may also be equipped with conventional mixing means (not shown). The applied composition 30 is leveled by suitable means such as doctor blade 35 and the composition is cured and fused by passing it through a suitable heating zone 36 for a time and at a temperature sufficient to cure and fuse the coated facing portion into a unitary body. The structure is cut by suitable means 37 into carpet tiles 38 having a cross-section as shown in FIG. 1 then passed into a magnetizing zone generally indicated as 39 to magnetize the magnetizable permanent magnet material 22 in the structure. A conventional endless belt conveyor support 40 disposed between an idler roll and a drive roll (both indicated generally as 40) is preferably used to support the carpet tiles 38 and their precursor forms throughout the forming process. As shown in FIG. 2, the process is preferably conducted in a semi-continuous fashion. It should be understood that cutting may be performed after magnetization (although that requires a significantly larger magnet) or the cured strip may be cut into sheets of smaller width and indeterminate length prior to magnetization with cutting into predetermined length after magnetization.

The liquid resinous composition 30 which is applied to the back of the carpet facing portion of the carpet tile of the present invention is a mixture of resin and permanently magnetizable particulate magnet material along with other components such as wetting agents, resin stabilizers and the like. As noted above, it has been found that in order to achieve satisfactory magnetized properties, that at least about 60, preferably at least about 75, weight percent of liquid resinous composition 30 (and therefor the backing portion of the carpet tile which backing portion itself constitutes from about 10 to about 35, preferably from about 20 to 30, percent of the total thickness of the carpet tile excluding any protruding fibers or yarn 11 should be of the magnetizable particulate permanent magnet material. Ferrites of the type $MO.6Fe_2O_3$ wherein M is Ba, Sr, Ca or Pb or mixtures thereof are the preferred magnetizable materials although other such magnetizable materials may also be used alone or in admixture with ferrites in a particular situation.

The resin may be any of the thermoplastic materials which are well known in the carpet tile art including elastomeric material such as the natural or synthetic rubbers such as sponge or foam rubber, polychloroprene, acrylonitrile-butadiene copolymers, ethylene-propylene-diene rubbers, and the like. Other suitable thermoplastic materials include, acrylic resin polymers and copolymers, petroleum resins, vinyl polymers, polybutene resins, polyisobutene-butadiene resins and copolymers and mixtures thereof. A preferred resilient thermoplastic material is a vinyl polymer such as polyvinyl chloride, polyvinylidene chloride, polyvinyl acetate, polyvinyl acetal, polyvinyl butyral, copolymers of any of these vinyl polymers and mixtures thereof. Polyvinyl chloride is most preferred of those and preferably is applied to the back of the facing portion in the form of a plastisol. Other preferred resilient thermoplastic materials are the acrylic resin polymers such as poly(acrylic acid) or poly(methacrylic acid) their salts and copolymers which form water-based emulsions. Such emulsions are well known in the art and are described, for example, in Water-Soluble Resins, Davidson et al, Reinhold Book Corp. (1962) pp. 154-174. In addition, such products are commercially available from a number of different sources.

In addition, the backing portion may be formed of a hot melt resin such as, for example, polyvinyl acetate, EVA (ethylene vinyl acetate copolymer), polypropylene, polyethylene, or the like to which the magnetizable particulate permanent magnet material is added. In this instance, a solvent, emulsifier or the like is, of course, unnecessary.

Generally, the uniform fluid mixture of the resin and permanently magnetizable particulate material will contain minor amounts of other ingredients such as stabilizers, plasticizers, wetting agents, thickeners and the like.

Stabilizers for these materials are well known in the art. When polyvinylchloride is utilized, the stabilizer is preferably barium stearate, zinc stearate or mixtures thereof or other metal soaps commonly used in the art.

Similarly, plasticizers for these materials are also well-known and any suitable conventional material can be used. Again, when polyvinyl chloride is used, esters of phosphoric acid or phthalic acid such as dioctyl phthalate are generally used.

It has also been found necessary in the incorporation of such significant amounts of particulate magnetizable material into liquid resinous compositions such as a vinyl chloride plastisol to utilize a conventional wetting agent such as polyethylene glycol and that the magnetizable permanent magnet particles be incorporated into the resin utilizing high shear dispersal equipment such as well known in the paint industry (for example a paint mill such as a three-roll mill) or other conventional high shear equipment.

It has also been found useful, as mentioned above, to preform the various components into two pre-mixes when the resin composition is a vinyl chloride plastisol. In one pre-mix (indicated generally as 34 in FIG. 2), the permanently magnetizable particulates, the wetting agent and a portion (up to about ⅔) of the plasticizer are mixed under high shear to form a uniform dispersion. In the other pre-mix (indicated generally as 33 in FIG. 2), the resin, the remaining plasticizer and the stabilizer are mixed under low shear. The pre-mix containing the resin must be mixed under relatively low shear because otherwise it will begin to fuse. After the first pre-mix has formed a uniform dispersion, it can be mixed with the second pre-mix slowly to form a uniform dispersion which is then applied to the back of the facing portion of the carpet tile as discussed above.

When water-based acrylic emulsions are used, it has been found that as much as 90% by weight (of the total) of the magnetizable permanent magnet material may be added without the need for the high shear mixing and premixing steps as with vinyl chloride plastisols.

After application, the material may be heated to gel and fuse the material. The fused carpet tile precursor is a flexible product. If desired, the composite may be pressed while heated. Also, if desired, the carpet tile precursor may be passed under an embossing roller to emboss the back of the carpet with indentations, corrugations, or the like (not shown) to form a friction-increasing surface and assist in consolidating the layer into a unitary product.

The consolidated, magnetized carpet material may then be severed by suitable cutting into appropriate length sections. For example, the carpet tile may be formed as an indeterminant length sheet of from 18 to 54 inches wide and then cut by suitable cutting means in the same length to thus form squares. Alternatively, a square may be cut from the carpet material by a square die.

The carpet tile precursor is then magnetized, for example by exposure to a sufficient magnetic field to cause the application of lines of force that are about ⅛ to 1/10 inches apart. If the magnetic fields are too far apart, the corners of the tile tend to buckle upon application. While the poles of the magnetic files can be closer, it has been found that application of sufficient magnetization to cause the magnetic fields to be approximately ⅛ to 1/10 inches separation is sufficient for intended commercial use. Generally, between about 140 to 190 Gauss at 500 to 600 volts is sufficient although the specific values may vary as understood by those skilled in the art.

The resulting carpet tile products are suitable for use as a floor covering particularly in areas where they have metallic floors, for example in areas where computers are used, to provide increased adherence to the floor.

The invention is additionallly described in connection with the following Examples which are to be considered illustrative of the present invention. It should be understood, however, that the invention is not limited to the specific details of the Examples.

EXAMPLE I

A carpet facing material that is made from nylon pile fabric which is cut from a plurality of continuous nylon filaments and pressed into a layer of polyvinyl chloride which had been applied as a tacky plastisol to a woven or non-woven glass scrim layer or mat to form a carpet tile facing with the pile fabric extending outwardly from the face of the layer. The material is 18 inches wide or multiples thereof and of continuous length.

A first pre-mix is made of 515 parts by weight (pbw) barium ferrite, 5 pbw polyethylene glycol (wetting agent and 40 pbw of dioctyl phthalate (which is ⅔ of the total plasticizer) in a high shear three-roll paint mill until the barium ferrite is uniformly dispersed. Separately, 100 pbw of polyvinyl chloride resin, 20 pbw dioctyl phthalate (the remainder of the plasticizer) and 1 pbw of mixed barium-calcium sulfate stabilizer are mixed at low shear and uniformly dispersed. Thereafter, the first pre-mix is added slowly until the entire mixture is uniformly dispersed. This material is then applied to the back of the above-mentioned carpet facing. The coated material is leveled with a doctor blade to smooth the polyvinyl chloride-magnetizable particulate material containing layer. The coated material is heated to 360° F. to gel and cure the polyvinyl chloride. The material is then cut by a die into 18 inch squares to form carpet tiles and then passed through a magnetizer to apply between 140 to 190 Gauss at 600 volts. The lines of force are between ⅛ and 1/10 inches apart. The resulting magnetized carpet tile shows excellent adherence to a steel floor.

EXAMPLE II

The same nylon pile fabric is pressed into a layer of poly(acrylic acid) formed from a commercially available water-based emulsion of the poly(acrylic acid) to form a carpet tile facing with the pile fabric extending outwardly therefrom. Separately, 900 parts by weight of barium ferrite is mixed with 100 parts by weight of the same water-based poly(acrylic acid) emulsion. The mixture is then coated onto the rear of above-mentioned carpet facing, dried and fused in the manner of Example I. The material is then magnetized and cut into carpet tiles which function similarly to those made in Example I.

The principles, preferred embodiments and modes of the operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A process for manufacturing a magnetic material containing carpet tile comprising:
    forming by high shear dispersal a uniform fluid plastisol mixture of a liquid resinous material comprising a polymer of a vinyl or vinylidene chloride, a wetting agent and at least about 60 percent by weight of the mixture of a particulate magnetizable material;
    applying the said uniform fluid mixture to the back of a carpet facing to form a carpet composite;
    heating the said carpet composite to solidify the mixture and fuse the mixture with the carpet facing and thereby provide a carpet covering;
    cutting the resulting magnetized carpet covering into carpet tiles; and
    applying a magnetic force to the carpet tiles to magnetize the particulate magnetizable material.

2. The process of claim 1 wherein the uniform fluid mixture contains at least about 75 percent by weight of the mixture of the particulate magnetizable material.

3. The process of claims 1 or 2 wherein the particulate magnetizable material is a barium, calcium or strontium ferrite.

4. The process of claim 1 wherein the uniform fluid mixture is a plastisol of a vinyl chloride polymer or copolymer with polyvinyl acetate.

5. The process of claim 4 wherein the said uniform fluid mixture is formed by first forming a uniform mixture of the particulate magnetizable material, a wetting agent and a plasticizer for the liquid resinous material and thereafter adding that mixture to a separate mixture of the liquid resinous material, a plasticizer therefor and a stabilizer therefor.

6. The product of the process of claim 5.

7. The process of claim 1 wherein the uniform fluid mixture contains at least about 90 percent by weight of the magnetizable particulate permanent magnet material.

8. The process of claim 7 wherein the particulate permanent magnet material is a ferrite of the general formula $MO \cdot 6Fe_2O_3$ wherein M is one or more of Ba, Sr, Ca or Pb.

9. The process of claim 8 wherein M is Ba.

* * * * *